Aug. 11, 1925.
L. HACHENBERG
1,549,304
PIPE UNION
Filed Dec. 18, 1923
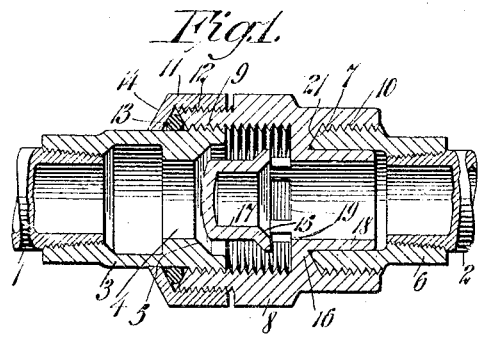
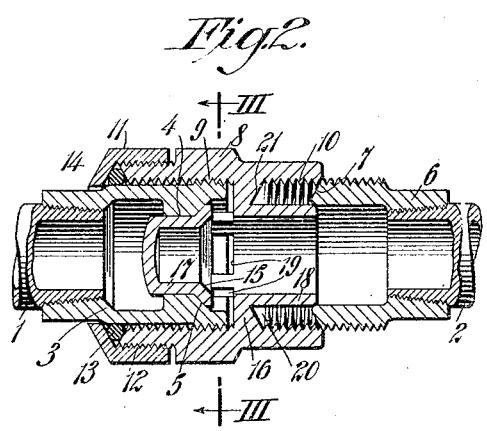
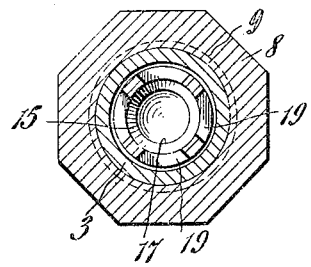
INVENTOR
Louis Hachenberg
BY
ATTORNEYS Patented Aug. 11, 1925.

1,549,304

UNITED STATES PATENT OFFICE.

LOUIS HACHENBERG, OF THROGGS NECK, NEW YORK.

PIPE UNION.

Application filed December 18, 1923. Serial No. 681,382.

*To all whom it may concern:*

Be it known that I, LOUIS HACHENBERG, a citizen of the United States, and resident of Throggs Neck, in the county of the Bronx and State of New York, have invented a new and useful Improvement in Pipe Unions, of which the following is a specification.

The object of my invention is to materially simplify the union structure and to provide a device in which an excessive leakage during the coupling and uncoupling operations is prevented.

A further object is to provide certain improvements in the construction, form and arangement of the several parts of a pipe union of that type in which one of two adjacent pipe sections is automatically opened and closed as the two pipe sections are coupled and uncoupled.

A practical embodiment of my invention is represented in the accompanying drawings, in which—

Fig. 1 represents a longitudinal section through my improved pipe union and two adjacent pipe sections, the parts being in the positions they assume when the two pipe sections are coupled and the valve opened.

Fig. 2 represents a similar section, the parts being in the positions they assume when the two pipe sections are uncoupled and the valve closed.

Fig. 3 represents a cross section taken in the plane of the line III—III of Fig. 2, looking in the direction of the arrows.

The two adjacent sections of a pipe line are designated by 1 and 2. The pipe section 1 is provided with a hollow terminal member 3, provided with an inner annular flange 4, forming a reduced bore surrounded by a valve seat 5.

The pipe section 2 is provided with a hollow terminal member 6 having a tapered outer end 7.

The union member 8 is screw-threaded at one end portion on to the terminal member 3 of the pipe section 1 and at its opposite end portion on to the terminal member 6 of the pipe section 2, as shown at 9 and 10 respectively. A collar 11 is screwed on to the end of the union member 8 which engages the terminal member 3, as shown at 12. A packing ring 13 surrounds and is movable along the terminal member 3 between an inwardly directed flange 14 of the collar 11 and the adjacent end of the union member 8.

A hollow valve 15 is connected by an imperforate web 16 to the union member 8 and forms an integral part of the same, which valve 15 is fitted to engage the seat 5 on the flange 4 of the terminal member 3 when the pipe sections are uncoupled to close the bore of said terminal member. This hollow valve has a reduced front extension 17, said extension slidably fitting the reduced bore of the terminal member 3 of the pipe section 1. This valve also has a rear extension 18 open through its rear end, which extension slidably fits the bore of the terminal member 6 of the other pipe section 2. This rear extension 18 of the valve 15 is provided in front of the web 16 with a side port formed, in the present instance, by an annular series of holes 19, through which port communication is established between the two pipe sections when coupled.

It will be seen that an annular recess 20 is formed between the rear extension 18 of the valve and the corresponding end portion of the union member 8, within which recess the terminal member 6 is located when the parts are coupled. The bottom of this recess which is formed by the web 16 is flared as shown at 21 to fit the tapered end 7 of the terminal member 6 when the pipe sections are coupled, to form a pressure fluid tight joint at this point.

Some of the numerous advantages arising from the structure herein shown and described are as follows:—

When the pipe sections are coupled, leakage is prevented along the terminal member 3 of the pipe section 1 by the packing ring 13, the tightness of which may be adjusted by the collar 11. Leakage is also prevented along the terminal member 6 of the pipe section 2 when the pipe sections are coupled by the fluid tight joint between the tapered end 7 of the said terminal member and the flaring seat 21 at the botom of the annular recess 20. As the pipe sections are being uncoupled, excessive leakage is prevented by the entrance of the front valve extension 17 into the reduced bore of the terminal member 3 before the rear valve extension 18 is removed from its sliding engagement with the bore of the terminal member 6. This engagement of the front and rear valve extensions with their respective terminal members permits the partial uncoupling movement of the union member for stopping the flow of the pressure fluid through the line when it is not desired to uncouple the pipe sections at the union, as for instance where repairs are to be made at points beyond the union.

It will be seen that the front and rear valve extensions form guides for bringing the two pipe sections into alinement, thus ensuring the proper coupling of the sections.

It is evident that various changes may be resorted to in the construction, form and arrangement of the several parts without departing from the spirit and scope of my invention; and hence, I do not wish to be limited to the particular embodiment herein shown and described, but what I claim is:—

1. A union for two adjacent pipe sections, comprising a union member having a screw-threaded engagement with both pipe sections and a valve carried by the union member arranged to open and close one of said pipe sections as the pipe sections are coupled, and uncoupled, said valve having front and rear extensions slidable in said pipe sections, the rear valve extension being hollow and having a side port for establishing communication therethrough around the valve.

2. A union for two adjacent pipe sections, comprising hollow terminal members carried by the pipe sections, a union member having a screw-threaded engagement with said terminal members, and a valve carried by the union member arranged to open and close one of the terminal members as the pipe sections are coupled and uncoupled, said valve having front and rear extensions slidable in the bores of their respective terminal members.

3. A union for two adjacent pipe sections, comprising hollow terminal members carried by the pipe sections, a union member having a screw-threaded engagement with said terminal members, and a valve integral with the union member arranged to open and close one of the terminal members as the pipe sections are coupled and uncoupled, said valve having integral front and rear extensions slidable in the bores of their respective terminal members.

4. A union for two adjacent pipe sections, comprising hollow terminal members carried by the pipe sections, a union member having a screw-threaded engagement with said terminal members, and a valve carried by the union member arranged to open and close one of the terminal members as the pipe sections are coupled and uncoupled, said valve having front and rear extensions slidable in the bores of their respective terminal members, the rear valve extension being hollow and having a side port for establishing communication therethrough around the valve.

5. A union for two adjacent pipe sections, comprising hollow terminal members carried by the pipe sections, a union member having a screw-threaded engagement with said terminal members, and a valve integral with the union member arranged to open and close one of the terminal members as the pipe sections are coupled and uncoupled, said valve having integral front and rear extensions slidable in the bores of their respective terminal members, the rear valve extension being hollow and having a side port for establishing communication therethrough around the valve.

6. A union for two adjacent pipe sections, comprising hollow terminal members carried by the pipe sections, a union member having a screw-threaded engagement with both terminal members, one terminal member having a valve seat surrounding its bore, and valve connected by an annular imperforate web with the union member arranged to open and close the bore of said last named terminal member as the sections are coupled and uncoupled, said valve having a rear hollow open ended extension slidable into and out of its terminal member, said rear extension having a side port in front of said web for establishing communication around the valve.

7. A union for two adjacent pipe sections, comprising hollow terminal members carried by the pipe sections, a union member having a screw-threaded engagement with both terminal members, one terminal member having a valve seat surrounding its bore, and a valve connected by an annular imperforate web with the union member arranged to open and close the bore of said last named terminal member as the sections are coupled and uncoupled, said valve having a front extension slidable into and out of the bore of its terminal member, and a rear hollow open ended extension slidable into and out of its terminal member, said rear extension having a side port in front of said web for establishing communication around the valve.

8. A union for two adjacent pipe sections, comprising hollow terminal members carried by the pipe sections, a union member having a screw-threaded engagement with both terminal members, one terminal member having a valve seat surrounding its bore, and a valve connected by an annular imperforate web with the union member arranged to open and close the bore of said last named terminal member as the sections are coupled and uncoupled, said valve having a rear hollow open ended extension slidable into and out of its terminal member, said rear extension having a side port in front of said web for establishing communication around the valve, the end of the last named terminal member engaging the said web with a fluid tight joint when the pipe sections are coupled.

9. A union for two adjacent pipe sections, comprising hollow terminal members carried by the pipe sections, a union member having a screw-threaded engagement with both terminal members, one terminal member having a valve seat surrounding its bore, and a valve connected by an annular imperforate web with the union member arranged to open and close the bore of said last named terminal member as the sections are coupled and uncoupled, said valve having a front extension slidable into and out of the bore of its terminal member, and a rear hollow open ended extension slidable into and out of its terminal member, said rear extension having a side port in front of said web for establishing communication around the valve, the end of the last named terminal member engaging the said web with a fluid tight joint when the pipe sections are coupled.

10. A union for two adjacent pipe sections, comprising hollow terminal members carried by the pipe sections, a union member having a screw-threaded engagement with both terminal members, one terminal member having a valve seat surrounding its bore, and a valve connected by an annular imperforate web with the union member arranged to open and close the bore of said last named terminal member as the sections are coupled and uncoupled, said valve having a rear hollow open ended extension slidable into and out of its terminal member, said rear extension having a side port in front of said web for establishing communication around the valve, said web having a flaring seat and said last named terminal member having a tapered end arranged to engage said seat with a fluid tight joint.

11. A union for two adjacent pipe sections, comprising hollow terminal members carried by the pipe sections, a union member having a screw-threaded engagement with both terminal members, one terminal member having a valve seat surrounding its bore, and a valve connected by an annular imperforate web with the union member arranged to open and close the bore of said last named terminal member as the sections are coupled and uncoupled, said valve having a front extension slidable into and out of the bore of its terminal member, said rear extension having a side port in front of said web for establishing communication around the valve, said web having a flaring seat and said last named terminal member having a tapered end arranged to engage said seat with a fluid tight joint when the pipe sections are coupled.

12. A union for two adjacent pipe sections, comprising hollow terminal members carried by the pipe sections, a union member having a screw-threaded engagement with said terminal members, and a valve carried by the union member adapted to open and close one of the terminal members as the pipe sections are coupled and uncoupled, a packing ring surrounding the last named terminal member at the end of the union member, and a collar engaging the union member and packing ring.

In testimony, that I claim the foregoing as my invention, I have signed my name this 17th day of December, 1923.

LOUIS HACHENBERG.